UNITED STATES PATENT OFFICE.

LUCY BROAD, OF ST. LOUIS, MISSOURI, ASSIGNOR TO CHARLES A. BROAD.

IMPROVED DISINFECTANT.

Specification forming part of Letters Patent No. 58,163, dated September 18, 1866.

*To all whom it may concern:*

Be it known that I, LUCY BROAD, of the city and county of St. Louis, and State of Missouri, have invented a new Disinfecting Compound for use in sick-rooms, and for general sanitary purposes; and I do hereby declare that the following is a full and clear description thereof.

I take of gum-camphor one-quarter of a pound, of rosin three pounds, of gum-myrrh one-quarter of a pound, of pine sawdust three pints, of coal-tar six ounces, of chloride of lime one-half pound. These ingredients I unite by thorough mixing, and the mass thus formed may be cut into small lumps or formed into balls of suitable size for ready use. One of these balls or pieces should be placed in some convenient place in the sick-room or other place to be fumigated and set on fire. It will burn slowly, with both flame and smoke, and will emit an odor at once pleasant and healthful.

Past experience has proven this to be one of the very best and cheapest of disinfectants, alike pleasant to use and to handle. In the sick-room and, especially in hospitals, it is invaluable.

Having described my invention, what I claim is—

The combination of the materials herein described in the proportions specified, or their chemical equivalents, for the purpose of producing a fumigating disinfectant.

LUCY BROAD.

Witnesses:
GEO. P. HERTHEL, Jr.,
M. RANDOLPH.